(12) United States Patent
Muramatsu et al.

(10) Patent No.: US 9,981,565 B2
(45) Date of Patent: May 29, 2018

(54) IMPEDANCE CONTROL DEVICE AND VEHICULAR NON-CONTACT POWER RECEIVING DEVICE

(71) Applicant: Yazaki Corporation, Tokyo (JP)

(72) Inventors: Shuichi Muramatsu, Shizuoka (JP); Satoru Horiuchi, Shizuoka (JP); Noritaka Taguchi, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 10 days.

(21) Appl. No.: 15/359,215

(22) Filed: Nov. 22, 2016

(65) Prior Publication Data

US 2017/0174088 A1 Jun. 22, 2017

(30) Foreign Application Priority Data

Dec. 17, 2015 (JP) .................................. 2015-246212

(51) Int. Cl.
*B60L 11/18* (2006.01)
*H02M 7/06* (2006.01)

(52) U.S. Cl.
CPC ............. *B60L 11/182* (2013.01); *H02M 7/06* (2013.01)

(58) Field of Classification Search
CPC .......... B60L 11/182; H02M 7/06; H02J 7/025
USPC ........................................................ 320/108
See application file for complete search history.

(56) References Cited

U.S. PATENT DOCUMENTS

| 8,552,596 B2 * | 10/2013 | Ichikawa et al. | H02J 5/005 307/104 |
| 8,987,941 B2 * | 3/2015 | Ichikawa | H02J 5/005 307/104 |
| 2015/0326035 A1 * | 11/2015 | Murayama | H02J 5/005 307/104 |

FOREIGN PATENT DOCUMENTS

JP 5459058 B2 4/2014

* cited by examiner

*Primary Examiner* — Sun Lin
(74) *Attorney, Agent, or Firm* — Kenealy Vaidya LLP

(57) ABSTRACT

An impedance control device includes a diode bridge rectifier circuit and a controller. The controller is configured to control, based on impedance of a battery that is coupled to output terminals of the diode bridge rectifier circuit, the capacitance of a first capacitance variable unit and capacitance of a second capacitance variable unit of the diode bridge rectifier circuit.

5 Claims, 4 Drawing Sheets

IMPEDANCE CONTROL DEVICE AND VEHICULAR NON-CONTACT POWER RECEIVING DEVICE

CROSS-REFERENCE TO RELATED APPLICATION(S)

The present application claims priority to and incorporates by reference the entire contents of Japanese Patent Application No. 2015-246212 filed in Japan on Dec. 17, 2015.

BACKGROUND OF THE INVENTION

1. Field of the Invention

The present invention relates to an impedance control device and a vehicular non-contact power receiving device.

2. Description of the Related Art

Conventionally, when electrical power is fed via a rectifier from an AC supplying unit to a load such as a battery for which the impedance fluctuates, an impedance control device causes impedance of the AC supplying unit to match the fluctuating impedance of the load. For example, in Japanese Patent No. 5459058, in a non-contact power transmission apparatus, impedance matching is performed between the AC supplying unit and the load by varying a duty ratio of a DC/DC converter. Accordingly, the AC power can be efficiently supplied to the load from the AC supplying unit.

However, in terms of efficiently supplying the AC power to the load, there is room for further improvement.

SUMMARY OF THE INVENTION

The present invention has been made in view of the above-mentioned circumstances, and an object of the invention is to provide an impedance control device and a vehicular non-contact power receiving device that are capable of efficiently supplying AC power to a load.

In order to solve the above mentioned problem and achieve the above mentioned object, an impedance control device according to one aspect of the present invention includes a diode bridge rectifier circuit that includes first and second diodes that are coupled in series in a forward direction, third and fourth diodes that are coupled in series in the forward direction, and first and second capacitance variable units that are coupled in series, the first and the second diodes being coupled to the third and the fourth diodes in parallel, the first capacitance variable unit being coupled to the third diode in parallel, the second capacitance variable unit being coupled to the fourth diode in parallel, a first AC electrode that outputs AC power being coupled between the first diode and the second diode, and a second AC electrode different from the first AC electrode being coupled between the third diode and the fourth diode as well as between the first capacitance variable unit and the second capacitance variable unit; and a controller configured to control, based on impedance of a load coupled to output terminals of the diode bridge rectifier circuit, capacitances of the first capacitance variable unit and the second capacitance variable unit.

According to another aspect of the present invention, in the impedance control device, it is preferable that the controller includes a detector that detects at least one of current and voltage of the load, and the controller performs feedback control of the capacitances of the first capacitance variable unit and the second capacitance variable unit, in response to changes in at least one of the current and the voltage of the load detected by the detector.

According to still another aspect of the present invention, in the impedance control device, it is preferable that the controller causes the capacitance of the first capacitance variable unit and the capacitance of the second capacitance variable unit to change by an identical capacitance value and at the same rate of change.

A vehicular non-contact power receiving device according to still another aspect of the present invention includes a diode bridge rectifier circuit that is provided on a vehicle, the diode rectifier circuit including first and second diodes that are coupled in series in a forward direction, third and fourth diodes that are coupled in series in the forward direction, and first and second capacitance variable units that are coupled in series, the first and the second diodes being coupled to the third and the fourth diodes in parallel, the first capacitance variable unit being coupled to the third diode in parallel, and the second capacitance variable unit being coupled to the fourth diode in parallel; a power receiving coil that is provided on the vehicle and receives AC power transmitted in a non-contact manner from a power transmission coil that is provided outside the vehicle, the power receiving coil including a first AC electrode that outputs AC power and a second AC electrode different from the first AC electrode, the first AC electrode being coupled between the first diode and the second diode, and the second AC electrode being coupled between the third diode and the fourth diode as well as between the first capacitance variable unit and the second capacitance variable unit; and a controller that is provided on the vehicle and configured to control, based on impedance of a battery coupled to output terminals of the diode bridge rectifier circuit, capacitances of the first capacitance variable unit and the second capacitance variable unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENT

Figure 1:
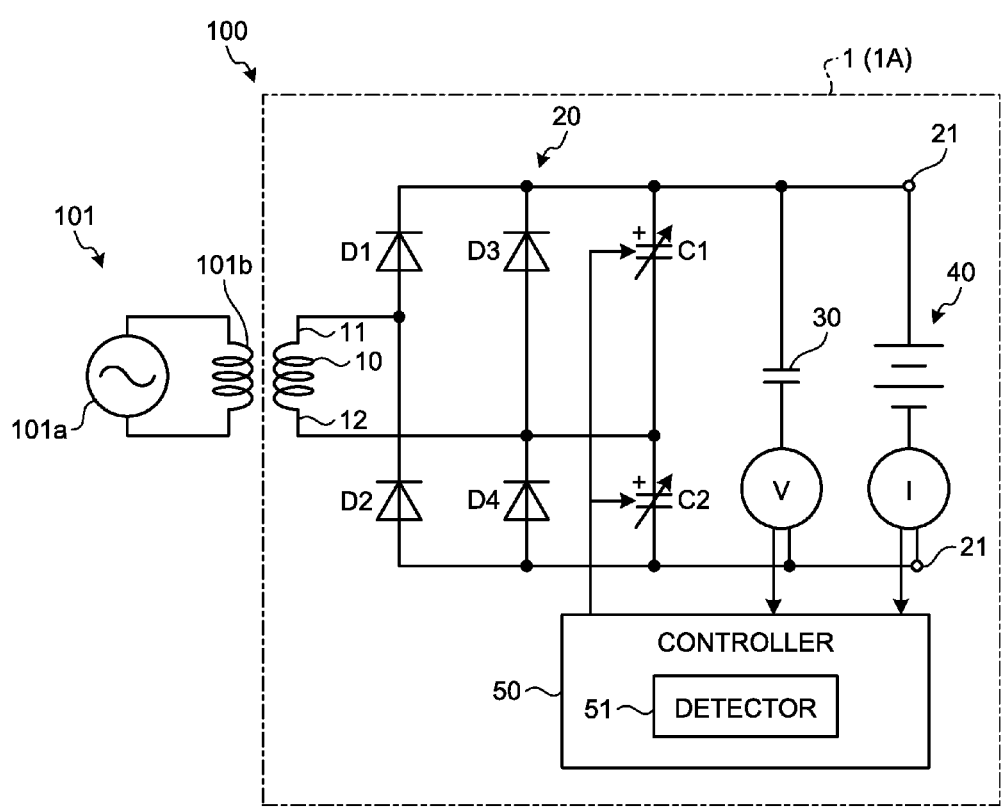
FIG. 1 is a block diagram illustrating a configuration example of an impedance control device and a vehicular non-contact power receiving device according to an embodiment.

With reference to the accompanying drawings, a form to implement the present invention (an exemplary embodiment) will be described in detail. The invention, however, is not limited by the content described in the following embodiment. Furthermore, the components described in the following include those that a person skilled in the art can easily assume or that are substantially the same. The configurations described in the following can be combined as appropriate. Moreover, various omissions, substitutions, or modifications of the configurations can be made without departing from the scope of the invention.

Embodiment

An impedance control device and a vehicular non-contact power receiving device according to an exemplary embodiment will be described. A non-contact electric power transmission system 100 includes a non-contact power transmission device 101 that transmits AC (alternating current) power, and a vehicular non-contact power receiving device 1 that receives the AC power transmitted from the non-contact power transmission device 101 in a non-contact manner. The non-contact power transmission device 101 is provided outside a vehicle such as on a charging station, and includes an AC power supply 101a that outputs AC power and a power transmission coil 101b that transmits the AC power received from the AC power supply 101a. The vehicular non-contact power receiving device 1 receives the AC power transmitted from the non-contact power transmission device 101 in a state of being opposite to the non-contact power transmission device 101.

The vehicular non-contact power receiving device 1 and an impedance control device 1A, as illustrated in FIG. 1, include a power receiving coil 10, a diode bridge rectifier circuit 20, a smoothing capacitor 30, a battery 40, and a controller 50. The vehicular non-contact power receiving device 1 and the impedance control device 1A are provided on a bottom portion of the vehicle, for example, and receive AC power by causing the impedance of the power receiving coil 10 side that supplies the AC power to match the impedance of the battery 40 side.

The power receiving coil 10 is coupled to the diode bridge rectifier circuit 20 and outputs the AC power to the diode bridge rectifier circuit 20. For example, the power receiving coil 10 receives the AC power that is transmitted from the power transmission coil 101b of the non-contact power transmission device 101 by electromagnetic induction or the like in a non-contact manner, and outputs the received AC power to the diode bridge rectifier circuit 20.

The diode bridge rectifier circuit 20 rectifies the AC power. The diode bridge rectifier circuit 20 includes first to fourth diodes D1 to D4, and first and second capacitance variable units C1 and C2. In the diode bridge rectifier circuit 20, the first and the second diodes D1 and D2 are coupled in series in the forward direction, the third and the fourth diodes are coupled in series in the forward direction, and the first and the second capacitance variable units C1 and C2 are coupled in series. In the diode bridge rectifier circuit 20, the first and the second diodes D1 and D2 are coupled to the third and the fourth diodes in parallel in the forward direction, and moreover, the first capacitance variable unit C1 is coupled to the third diode D3 in parallel and the second capacitance variable unit C2 is coupled to the fourth diode D4 in parallel. In the diode bridge rectifier circuit 20, a first AC electrode 11 of the power receiving coil 10 is coupled between the first diode D1 and the second diode D2, and a second AC electrode 12 different from the first AC electrode 11 is coupled between the third diode D3 and the fourth diode D4 and is coupled between the first capacitance variable unit C1 and the second capacitance variable unit C2.

The first and the second diodes D1 and D2 rectify the AC power output from the power receiving coil 10. The third diode D3 protects the first capacitance variable unit C1 and prevents an overvoltage in reverse polarity from being applied to the first capacitance variable unit C1. The fourth diode D4 protects the second capacitance variable unit C2 and prevents an overvoltage in reverse polarity from being applied to the second capacitance variable unit C2. The first capacitance variable unit C1 is a variable capacitor, for example, and performs charging and discharging of electrical current through the first diode D1. The second capacitance variable unit C2 is a variable capacitor, for example, and performs charging and discharging of electrical current through the second diode D2. In the first and the second capacitance variable units C1 and C2, variable capacitors of an identical capacitance and of the same characteristics are used, for example.

In the diode bridge rectifier circuit 20, when the first AC electrode 11 is of positive polarity, an alternating current is charged to the first capacitance variable unit C1 through the first diode D1. In the diode bridge rectifier circuit 20, when the first AC electrode 11 is of negative polarity, the alternating current is charged to the second capacitance variable unit C2 through the second diode D2. The diode bridge rectifier circuit 20 outputs, to output terminals 21, a voltage obtained by combining the charged voltage of the first capacitance variable unit C1 and the charged voltage of the second capacitance variable unit C2.

Figure 2:
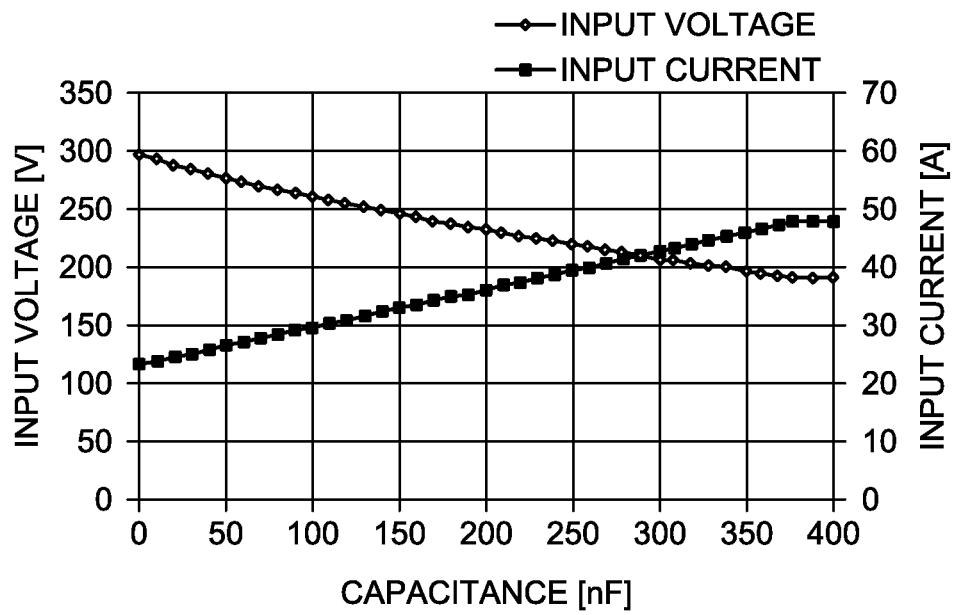
FIG. 2 is a chart illustrating the changes in input voltage and input current by the capacitance of a diode bridge rectifier circuit in the embodiment (output voltage=330 V)
Figure 3:
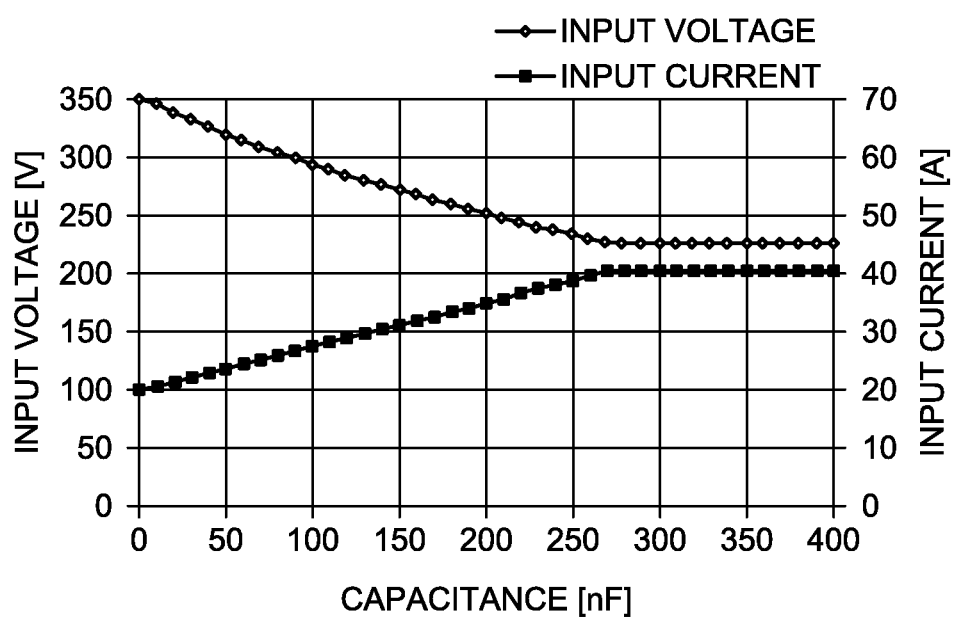
FIG. 3 is a chart illustrating the changes in the input voltage and the input current by the capacitance of the diode bridge rectifier circuit in the embodiment (output voltage=390 V)

The diode bridge rectifier circuit 20 has the characteristics in which, when the electrostatic capacity (capacitance) of the first and the second capacitance variable units C1 and C2 varies, the effective values of the input voltage and the input current of the diode bridge rectifier circuit 20 vary. For example, in the diode bridge rectifier circuit 20, as illustrated in FIGS. 2 and 3, when the capacitance of the first and the second capacitance variable units C1 and C2 increases, the input voltage falls and the input current rises. When the capacitance of the first and the second capacitance variable units C1 and C2 decreases, the input voltage rises and the input current falls. Accordingly, in the diode bridge rectifier circuit 20, the input voltage and the input current are set to any desired values by the increase and decrease of the first and the second capacitance variable units C1 and C2. That is, the diode bridge rectifier circuit 20 can vary the input and output impedance of the diode bridge rectifier circuit 20, by the increase and decrease of the first and the second capacitance variable units C1 and C2. This is because the charging and discharging are performed in accordance with the capacitance of the first and the second capacitance variable units C1 and C2. Note that, in the diode bridge rectifier circuit 20, the input voltage and the input current are determined, in addition to the capacitance of the first and the second capacitance variable units C1 and C2, by the output power, the frequency of AC power, and the output voltage. In the analysis result illustrated in FIG. 2, the output power was set to 7000 W, the frequency of AC power was set to 85 kHz, and the output voltage was set to 330 V. In the analysis result illustrated in FIG. 3, the output power was set to 7000 W, the frequency of AC power was set to 85 kHz, and the output voltage was set to 390 V.

In the diode bridge rectifier circuit 20, when the capacitance of the first and the second capacitance variable units C1 and C2 reaches a certain capacitance value, the effective values of the input voltage and the input current are constant.

For example, in the diode bridge rectifier circuit 20, in the case that the output voltage is 330 V, the effective values of the input voltage and the input current become constant when the capacitance of the first and the second capacitance variable units C1 and C2 is approximately 380 nF (see FIG. 2). Furthermore, in the diode bridge rectifier circuit 20, in the case that the output voltage is 390 V, the effective values of the input voltage and the input current become constant when the capacitance of the first and the second capacitance variable units C1 and C2 is approximately 270 nF (see FIG. 3). In the diode bridge rectifier circuit 20, of the capacitance values at which the effective values of the input voltage and input current are constant, the capacitance of the first and the second capacitance variable units C1 and C2 is varied up to the smallest capacitance value (an upper limit capacitance value). When the capacitance of the first and the second capacitance variable units C1 and C2 reaches the upper limit capacitance value, the diode bridge rectifier circuit 20 operates as a voltage doubler rectifier circuit in which the voltage of the first capacitance variable unit C1 and the voltage of the second capacitance variable unit C2 are combined.

The smoothing capacitor 30 is coupled to the diode bridge rectifier circuit 20 in parallel, and smoothes the current (pulsating current) rectified by the diode bridge rectifier circuit 20 and outputs the smoothed current to the battery 40.

The battery 40 is a load and supplies power to a motor for driving an electric vehicle, and electrical components such as a light of the vehicle, for example. The battery 40 is coupled to the output terminals 21 of the diode bridge rectifier circuit 20 and charges a direct current smoothed by the smoothing capacitor 30. In the battery 40, the impedance of the battery 40 varies depending on the amount of charge.

Figure 4:
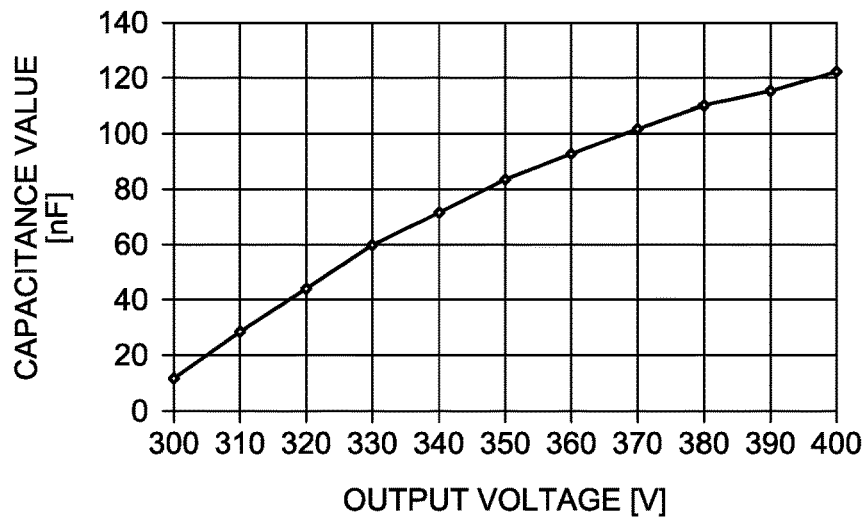
FIG. 4 is a chart illustrating the relation between the capacitance and the output voltage in the diode bridge rectifier circuit in the embodiment.

The controller 50 controls, based on the impedance of the battery 40 that is coupled to the diode bridge rectifier circuit 20, the capacitance of the first capacitance variable unit C1 and that of the second capacitance variable unit C2. The controller 50 is a feedback circuit and includes a detector 51 that detects at least one of the current and the voltage of the battery 40, for example. The controller 50 performs, in response to the changes in at least one of the current and the voltage of the battery 40 detected by the detector 51, feedback control of the capacitance of the first capacitance variable unit C1 and that of the second capacitance variable unit C2. For example, the controller 50 controls, based on the output voltage of the diode bridge rectifier circuit 20 detected by the detector 51, the capacitance of the first capacitance variable unit C1 and that of the second capacitance variable unit C2. Specifically, the controller 50 refers to the correspondence relation between the capacitance value of the first and the second capacitance variable units C1 and C2 and the output voltage of the diode bridge rectifier circuit 20, which is illustrated in FIG. 4, and acquires the capacitance value corresponding to the output voltage. FIG. 4 illustrates the capacitance value at which the impedance of the battery 40 side becomes an optimal load value $R_L$ (for example, 10Ω) which will be described later, with respect to the changes in the output voltage. The controller 50 sets the capacitance value corresponding to the output voltage to the capacitance of the first and the second capacitance variable units C1 and C2. The controller 50 performs control so that, when the output voltage of the diode bridge rectifier circuit 20 rises, the capacitance value of the first and the second capacitance variable units C1 and C2 is increased. At this time, the controller 50 changes the capacitance of the first capacitance variable unit C1 and that of the second capacitance variable unit C2, by an identical capacitance value and at the same rate of change. That is, because the variable capacitors of the identical capacitance are used for the first and the second capacitance variable units C1 and C2 and the controller 50 changes the capacitance by the identical capacitance value, the first and the second capacitance variable units C1 and C2 are changed at the same rate of change.

Next, the power transmission efficiency of the non-contact electric power transmission system 100 will be described. In the non-contact electric power transmission system 100, there is the optimal load value $R_L$ at which the power transmission efficiency is the best. The optimal load value $R_L$ is calculated by the following Expression 1.

$$R_L = R_2\sqrt{1 + f_m^2}$$

$$f_m^2 = k^2 Q_1 Q_2,\ Q_1 = \frac{2\pi f \cdot L_1}{R_1},\ Q_2 = \frac{2\pi f \cdot L_2}{R_2}$$

Expression 1

In Expression 1, kappa (k) is a coupling coefficient, $R_1$ is a resistance value of the power transmission coil 101b of the non-contact power transmission device 101, and $R_2$ is a resistance value of the power receiving coil 10 of the vehicular non-contact power receiving device 1. Furthermore, in Expression 1, $L_1$ is an inductance of the power transmission coil 101b, $L_2$ is an inductance of the power receiving coil 10, and f is a frequency of the AC power.

Figure 5:
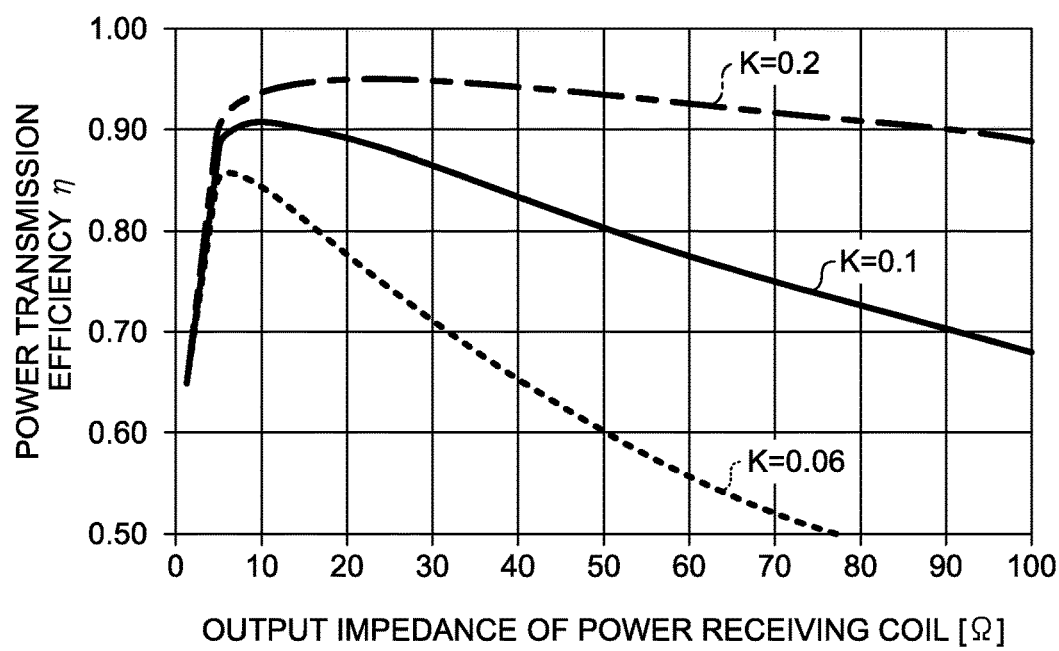
FIG. 5 is a chart illustrating an inter-coil power transmission efficiency with respect to the output impedance of a power receiving coil in the embodiment.

The transmission efficiency of the non-contact electric power transmission system 100 varies, as illustrated in FIG. 5, by the coupling coefficient k, and the output impedance of the power receiving coil 10. In FIG. 5, the ordinate axis represents the power transmission efficiency of the vehicular non-contact power receiving device 1, and the abscissa axis represents the output impedance of the power receiving coil 10. FIG. 5 illustrates examples in which the inductance $L_1$ and $L_2$ are 200 μH and in which the coupling efficiency k is 0.2, 0.1, or 0.06. According to the analysis result illustrated in FIG. 5, it can tell that the transmission efficiency of the non-contact electric power transmission system 100 is good when the output impedance of the power receiving coil 10 is approximately 5 to 10Ω. Furthermore, in the non-contact electric power transmission system 100, it can tell that the transmission efficiency is better as the coupling coefficient k is greater. In the non-contact electric power transmission system 100, it can tell that the optimal load value $R_L$ is pronouncedly present when the coupling coefficient k is small (for example, in the case that k=0.06). Accordingly, in the non-contact electric power transmission system 100, it can tell that the impedance control is particularly effective when the coupling coefficient k is small. The non-contact electric power transmission system 100 receives AC power in a state that the power receiving coil 10 of the vehicular non-contact power receiving device 1 and the power transmission coil 101b of the non-contact power transmission device 101 are opposite to each other, and thus the variation in the coupling coefficient k is likely to occur. For example, in the non-contact electric power transmission system 100, if the deviation in the planar direction occurs between the opposing surface of the power receiving coil 10 and the opposing surface of the power transmission coil 101b, the coupling coefficient k becomes smaller.

Figure 6:
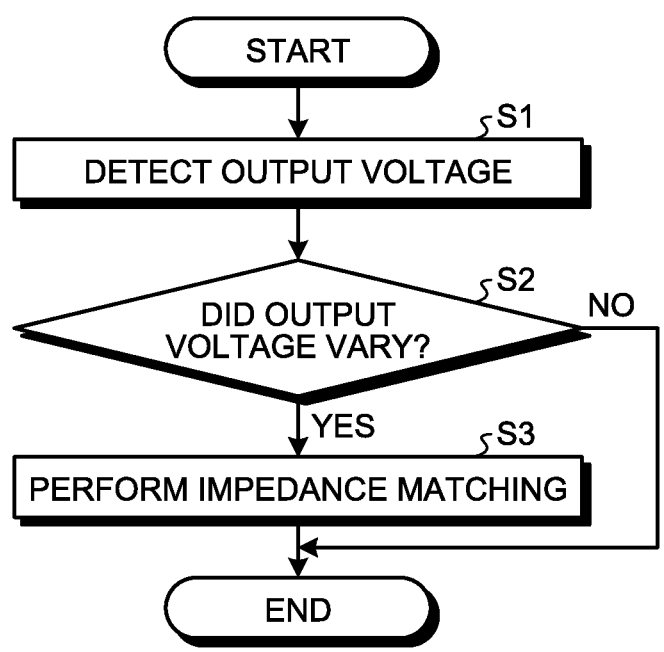
FIG. 6 is a flowchart illustrating an operation example of the impedance control device and the vehicular non-contact power receiving device in the embodiment.

Next, an example of the operation of the vehicular non-contact power receiving device 1 will be described. First, in the vehicular non-contact power receiving device 1, as illustrated in FIG. 6, the detector 51 detects the output voltage of the diode bridge rectifier circuit 20 (Step S1). The output voltage of the diode bridge rectifier circuit 20 varies by the state of charge (SOC) of the battery 40. Then, the controller 50 determines whether the output voltage varied (Step S2). When the controller 50 determines that the output voltage varied (Yes at Step S2), the controller 50 performs impedance matching (Step S3). For example, the controller 50 acquires, based on the output voltage detected at the above-described Step S1, the capacitance value of the first and the second capacitance variable units C1 and C2 at which the impedance of the battery 40 side matches the optimal load value $R_L$ (for example, 10Ω). Specifically, the controller 50 refers to the correspondence relation between the output voltage and the capacitance value illustrated in FIG. 4, and acquires the capacitance value corresponding to the output voltage detected at the above-described Step S1. The controller 50 sets the acquired capacitance value to a target command of the capacitance of the first and the second capacitance variable units C1 and C2. Accordingly, the vehicular non-contact power receiving device 1 can perform the impedance matching. At the above-described Step S2, when the controller 50 determines that the output voltage did not vary (No at Step S2), the controller 50 maintains the capacitance value of the first and the second capacitance variable units C1 and C2.

As in the foregoing, the vehicular non-contact power receiving device 1 and the impedance control device 1A in the embodiment control, based on the impedance of the battery (load) 40, the capacitance of the first and the second capacitance variable units C1 and C2 of the diode bridge rectifier circuit 20. Thus, the vehicular non-contact power receiving device 1 and the impedance control device 1A enable the impedance (the optimal load value $R_L$) of the power receiving coil 10 side that supplies AC power and the impedance of the battery 40 side that fluctuates to be matched with each other effectively. As a result, the vehicular non-contact power receiving device 1 and the impedance control device 1A can efficiently supply the AC power received by the power receiving coil 10 to the battery 40. Furthermore, when performing the impedance control, the vehicular non-contact power receiving device 1 and the impedance control device 1A can perform the power transmission in high efficiency, without using a DC (direct current)/DC converter and a dedicated impedance matching circuit as with a conventional manner. The vehicular non-contact power receiving device 1 and the impedance control device 1A can vary in multiple stages the impedance of the battery 40 side according to the state of charge of the battery 40, and thus can accurately control the impedance of the battery 40 side.

Furthermore, the impedance control device 1A performs, in response to the changes in at least one of the current and the voltage of the battery 40 detected by the detector 51, the feedback control of the capacitance of the first and the second capacitance variable units C1 and C2. Accordingly, the impedance control device 1A enables the impedance of the battery 40 side and the impedance of the power receiving coil 10 side to be matched with each other, in response to the output voltage of the battery 40 that varies depending on the amount of charge, for example.

The impedance control device 1A changes the capacitance of the first capacitance variable unit C1 and that of the second capacitance variable unit C2, by an identical capacitance value and at the same rate of change. Accordingly, the impedance control device 1A can control the capacitance of the first and the second capacitance variable units C1 and C2 easily, and enables the impedance of the battery 40 side and the impedance of the power receiving coil 10 side to be matched with each other at a low cost.

Modifications

Next, modifications of the embodiment will be described. The load may be, in addition to the battery 40 of the vehicle, a motor of the vehicle, and may be a battery, a motor, and others of other than the vehicle. Furthermore, to the load, another load may be added newly. In this case, the controller 50 changes the capacitance of the first and the second capacitance variable units C1 and C2 and enables the impedance including the other added load and that of the power receiving coil 10 side to be matched with each other.

Moreover, the first and the second capacitance variable units C1 and C2 are not limited to variable capacitors. For example, as for the first and the second capacitance variable units C1 and C2, the capacitance value may be varied by using switching elements or the like, the number of coupled capacitors may be switched by using switching elements or the like, or variable capacitance diodes may be used.

The controller 50 has been exemplified to change the capacitance of the first and the second capacitance variable units C1 and C2 by an identical capacitance value and at the same rate of change. However, it is not limited thereto. For example, the controller 50 may change the capacitance of the first capacitance variable unit C1 and that of the second capacitance variable unit C2, by different capacitance values and at different rates of change. Furthermore, the controller 50 may change the capacitance of the first capacitance variable unit C1 and that of the second capacitance variable unit C2, at different timing.

In the first and the second capacitance variable units C1 and C2, one of the capacitance variable units may be a capacitor for which the capacitance is fixed.

The impedance control device and the vehicular non-contact power receiving device in the embodiments control, based on the impedance of a load, the capacitance of the first capacitance variable unit and the second capacitance variable unit of the diode bridge rectifier circuit, and thereby enabling the impedance to be effectively matched with the fluctuating impedance of the load. As a result, the impedance control device and the vehicular non-contact power receiving device are capable of supplying the AC power to the load efficiently.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. An impedance control device, comprising:
a diode bridge rectifier circuit that includes a first diode and a second diode that are coupled in series in a forward direction, a third diode and a fourth diode that are coupled in series in the forward direction, and a first capacitance variable unit and a second capacitance variable unit that are coupled in series, the first diode and the second diode being coupled to the third diode and the fourth diode in parallel, the first capacitance variable unit being coupled to the third diode in parallel, the second capacitance variable unit being coupled to the fourth diode in parallel, a first AC electrode that outputs AC power being coupled between the first diode and the second diode, and a second AC electrode different from the first AC electrode being coupled between the third diode and the fourth diode as well as between the first capacitance variable unit and the second capacitance variable unit; and a controller configured to control, based on impedance of a load coupled to output terminals of the diode bridge rectifier circuit, capacitance of the first capacitance variable unit and capacitance of the second capacitance variable unit.

2. The impedance control device according to claim 1, wherein the controller includes a detector that detects at least one of current and voltage of the load, and the controller performs feedback control of the capacitance of the first capacitance variable unit and the capacitance of the second capacitance variable unit, in response to changes in at least one of the current and the voltage of the load detected by the detector.

3. The impedance control device according to claim 1, wherein the controller causes the capacitance of the first capacitance variable unit and the capacitance of the second capacitance variable unit to change by an identical capacitance value and at a same rate of change.

4. The impedance control device according to claim 2, wherein the controller causes the capacitance of the first capacitance variable unit and the capacitance of the second capacitance variable unit to change by an identical capacitance value and at a same rate of change.

5. A vehicular non-contact power receiving device, comprising:

a diode bridge rectifier circuit that is provided on a vehicle, the diode bridge rectifier circuit including a first diode and a second diode that are coupled in series in a forward direction, a third diode and a fourth diode that are coupled in series in the forward direction, and a first capacitance variable unit and a second capacitance variable unit that are coupled in series, the first diode and the second diode being coupled to the third diode and the fourth diode in parallel, the first capacitance variable unit being coupled to the third diode in parallel, and the second capacitance variable unit being coupled to the fourth diode in parallel;

a power receiving coil that is provided on the vehicle and receives AC power transmitted in a non-contact manner from a power transmission coil that is provided outside the vehicle, the power receiving coil including a first AC electrode that outputs AC power and a second AC electrode different from the first AC electrode, the first AC electrode being coupled between the first diode and the second diode, and the second AC electrode being coupled between the third diode and the fourth diode as well as between the first capacitance variable unit and the second capacitance variable unit; and a controller that is provided on the vehicle and configured to control, based on impedance of a battery coupled to output terminals of the diode bridge rectifier circuit, capacitance of the first capacitance variable unit and capacitance of the second capacitance variable unit.

* * * * *